Oct. 18, 1949.  E. FREEMAN  2,485,272
OPTICAL EYE TESTING APPARATUS
Filed Sept. 25, 1946  4 Sheets-Sheet 1
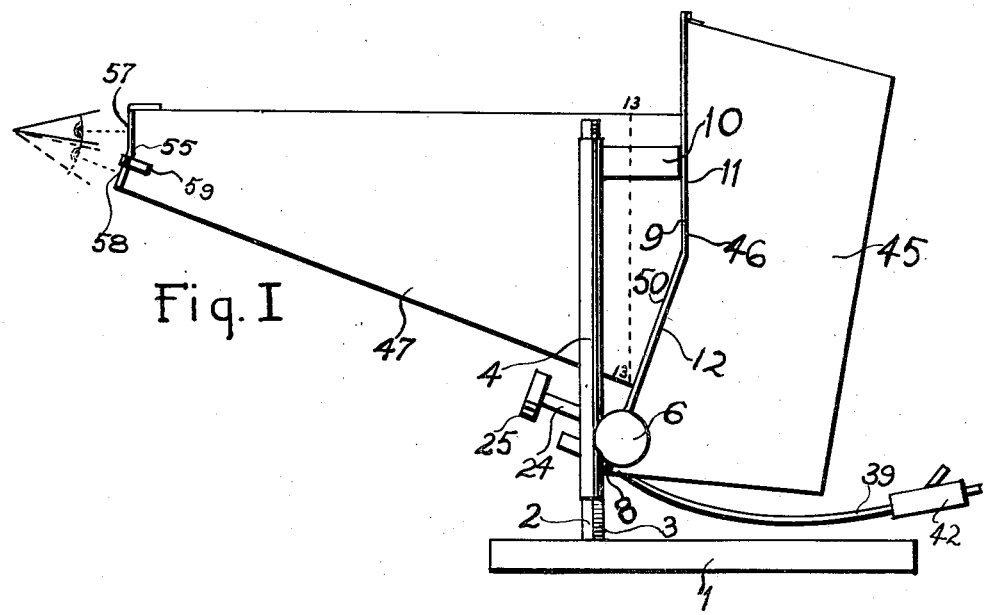
Fig. I
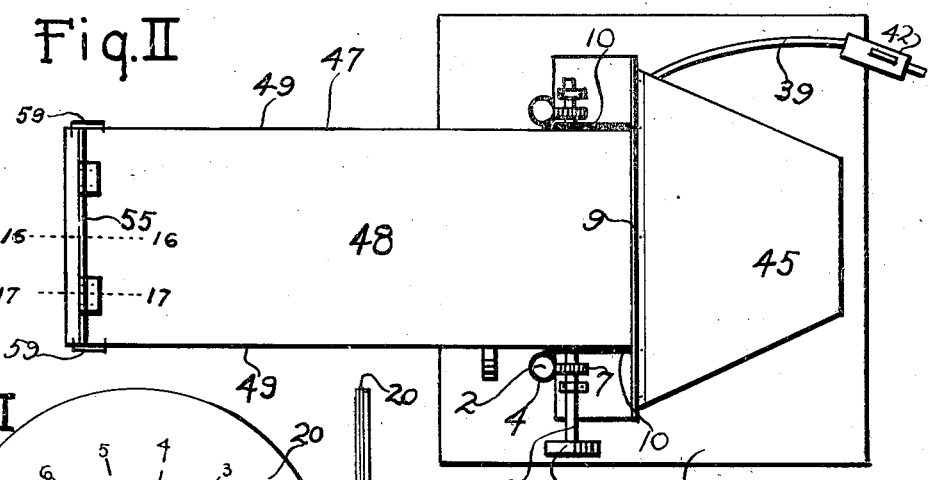
Fig. II
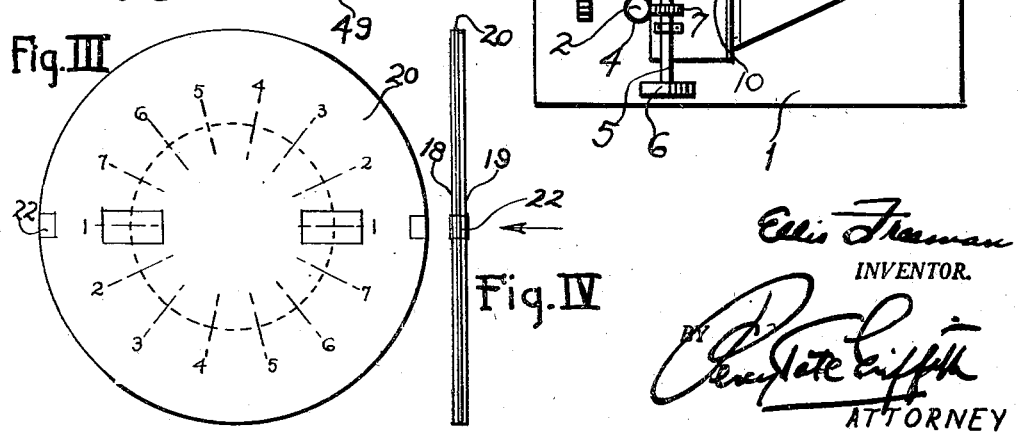
Fig. III  Fig. IV
Ellis Freeman
INVENTOR.
ATTORNEY

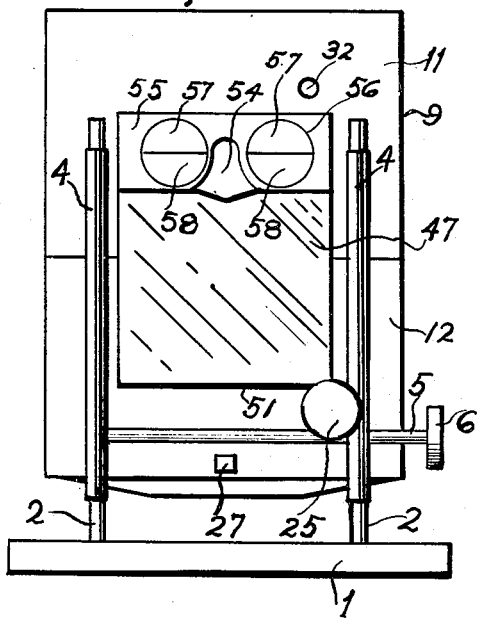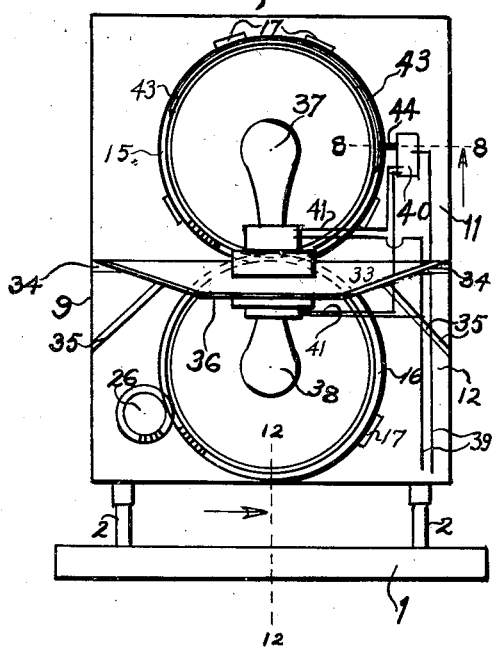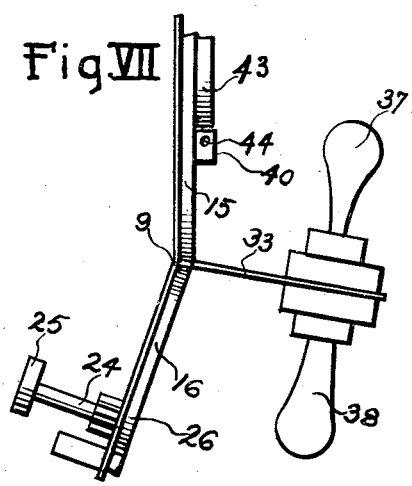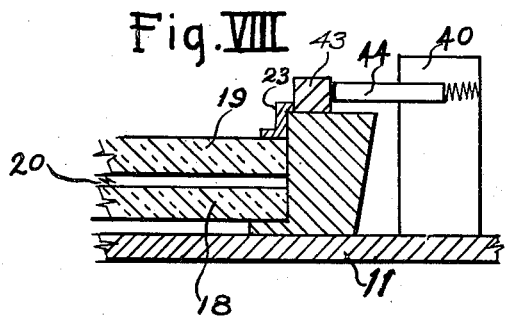

Oct. 18, 1949. E. FREEMAN 2,485,272
OPTICAL EYE TESTING APPARATUS
Filed Sept. 25, 1946 4 Sheets-Sheet 3
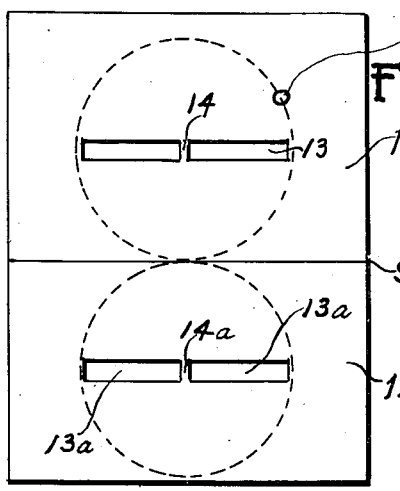
Fig. IX
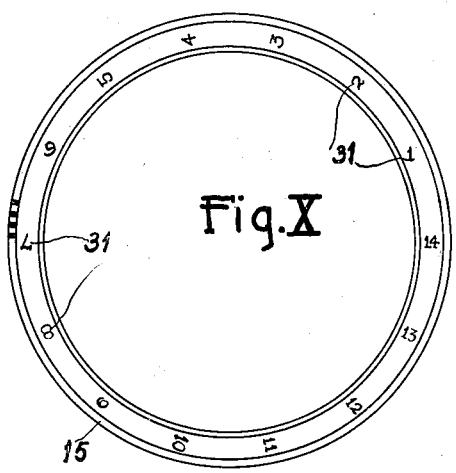
Fig. X
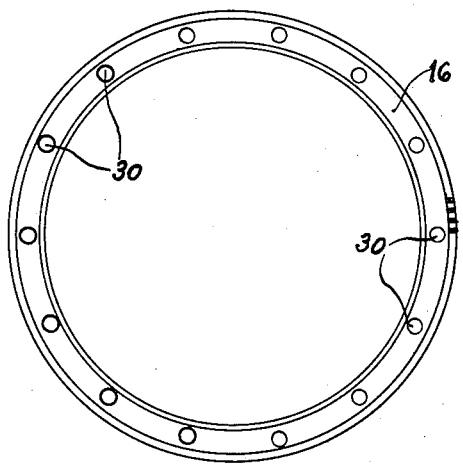
Fig. XI
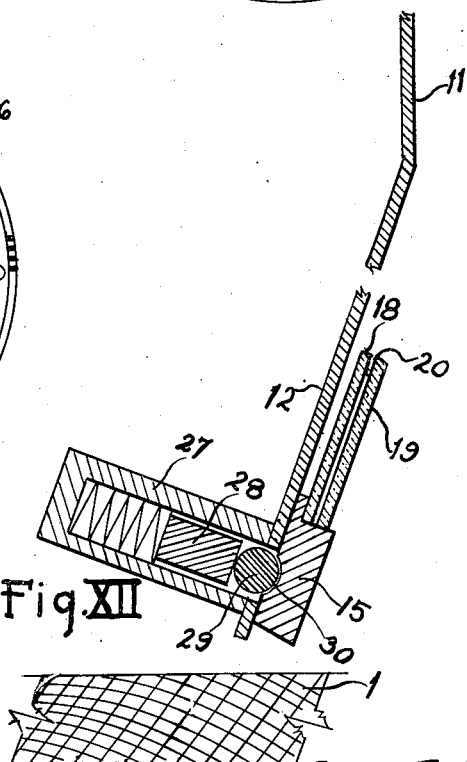
Fig. XII
Ellis Freeman
INVENTOR.
ATTORNEY Oct. 18, 1949.  E. FREEMAN  2,485,272
OPTICAL EYE TESTING APPARATUS
Filed Sept. 25, 1946  4 Sheets-Sheet 4
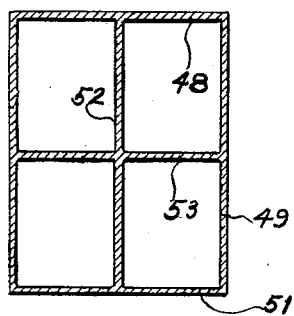
Fig. XIII
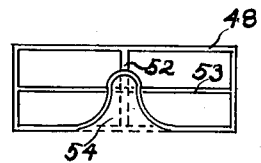
Fig. XIV
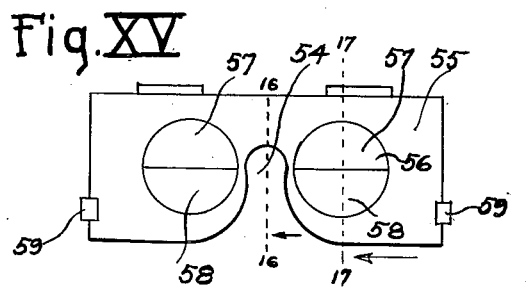
Fig. XV
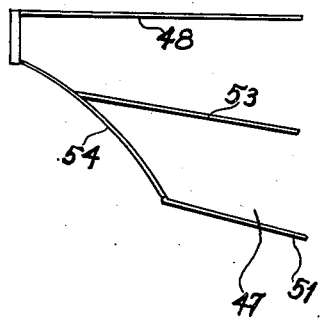
Fig. XVI
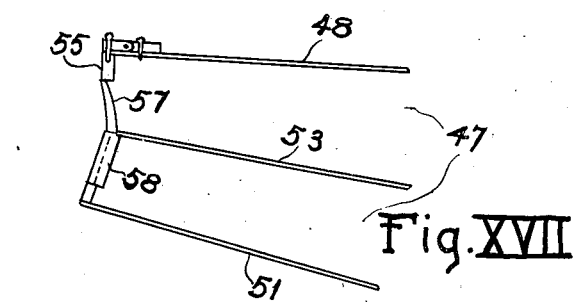
Fig. XVII
Ellis Freeman
INVENTOR.
ATTORNEY Patented Oct. 18, 1949

2,485,272

UNITED STATES PATENT OFFICE 2,485,272

OPTICAL EYE TESTING APPARATUS

Ellis Freeman, Sarasota, Fla.

Application September 25, 1946, Serial No. 699,113

16 Claims. (Cl. 88—20)

This invention relates to the quite modern class of eye testing apparatus, generically of the stereoscopic form or of modified stereoscopic basis, which are employed for the purpose of viewing test targets and testing the eyes of a mass of subjects, such as employees in a business or industrial establishment, scholars in a school or college, soldiers, and similar groups, who are successively preliminarily examined singly through the agency of the instrument, and primary records made of certain facts and conditions relating to their qualities, and normalities, or defects, of vision. This species of test, as practiced today, is in reality designed to determine what proportion and number of persons need no attention for correction of their vision, and what ones require further and expert individual examination, as well as measures of treatment by glasses or otherwise, and this is generally termed screening, or the separation of the adequately normal from the vocationally or otherwise defective in requisite characteristics of vision.

There is in the art comparative agreement as to the specific tests given to the subjects uniformly in such screening, and the chief distinctions of the various devices employed, and the aim of those seeking to invent better methods, is in respect to the means and manners of making and presenting such tests, rather than in any subtle attempt to elaborate any or all of the tried and accepted units of tests actually viewed by the subjects.

Having found in my own and others' work in this art, that the said tests seem to present an unsatisfactory measure of inaccuracy in many instances, and that some of this is due to the method of presenting the tests and to the instruments employed, the objects of my invention are (while using no different test images than before) to provide an eye-testing machine or instrument which shall:

First, reduce to a minimum the optical factors interposed between the eye of the subject and the test images on the target.

Second, eliminate practically all the needless work of the operator in changing the parts of the machine to show the near and the distance vision targets, by making the instrument present them automatically, one set following the other without adjustment of parts.

Third, eliminate all need for oral instructions beyond the fundamental directions to look through the ocular and report what he sees.

Fourth, operate to automatically show the subject, just what it is desired for him to see, without change of his position or that of the ocular.

Fifth, operate automatically to first present visibly the near test images to the subject, through one part of the ocular, or eye-piece, and without interruption continuously present the distance tests to the subject through another part of the same ocular.

Sixth, eliminate pauses while the operator suspends the testing until the said operator manipulates the machine.

Seventh, do away with the necessity for using plus lenses on the near test, with the heavy errors resultant therefrom.

Eighth, do away with the necessity for using prisms and lenses combined, for distance tests, similarly with resultant errors.

Ninth, provide means whereby both near and distance tests can be set at the same physical distance, in the same instrument, from the one ocular while yet being viewed by the subject only through the correct glass for the respective test viewed.

Tenth, take less time of the subject and the operator, both, and enable the making of better and more accurate tests as well.

With these and other objects in view, my invention consists in the novel structure and arrangement and combination of parts to carry out these objects, hereinafter fully described in this specification and defined in the appended claims.

A preferred embodiment of my invention, in the form in which I have thus far constructed it for the specific purposes indicated, out of various uses to which by structural and detailed adaptation it may be put, is set forth in this specification, and shown in the accompanying drawings, in which like numerals of reference designate like parts in the several views, and in which:

Figure 1 is a side elevation of my newly invented instrument, taken upon the right side of the device, relatively to the viewer therethrough, who is represented diagrammatically by the pupil of an eye in full lines at top and dotted lines beneath, for reasons of clarity of description of the operation, as will fully appear later.

Figure 2 is a plan view of the said instrument or apparatus.

Figure 3 is a front elevation of the tests-target and holder, or plurality of disks set together and forming an illuminated transparency, carrying and displaying the tests in rotation to the viewer; the said tests upon said target being indicated diagrammatically, as my instrument employs any usual or desired test-units or test-images commonly used in the stereoscopic class of eye-testing instruments to which my invention belongs. As the glass holder-disk in front of the target 20 is transparent, only the said target 20 is actually visible in this figure.

Figure 4 is an edge view or right side elevation of the same; the arrow indicating the direction of illumination.

Figure 5 is a front elevation of the instrument.

Figure 6 is a rear elevation thereof, with the rear housing removed.

Figure 7 is a right side elevation or edge view of the rotary gear system carrying the transparency targets, removed from the apparatus, together with the double illumination means.

Figure 8 is an enlarged sectional view of the cam and switch operating means forming part of the device, taken upon the line 8—8 of Figure 6.

Figure 9 is a front elevation of the angled plate which lies at the rear of the tunnel or wide tube mounted upon the front of the apparatus, and projecting forwardly therefrom, the said plate having been removed from the instrument.

Figure 10 is a front elevation of the upper external ring gear attached to the test-target, greatly enlarged and removed therefrom and from the apparatus.

Figure 11 is a similar view of the lower external ring gear.

Figure 12 is an enlarged detail and partially fragmentary central vertical sectional view taken on the line 12—12 of Figure 6, showing the detent means forming a part of the device.

Figure 13 is a transverse vertical section of the tunnel or tube taken upon the line 13—13 of Figure 1.

Figure 14 is a front elevation of the said tunnel or tube, with the lens plate or optical system which is hinged in front thereof, removed.

Figure 15 is a front elevation of said hinged lens plate or optical system, much enlarged.

Figure 16 is a vertical section thereof, taken upon the line 16—16 of Figure 15, showing also the nose recess and horizontal septum, of the instrument.

Figure 17 is a vertical section, on the line 17—17, of Figure 15, showing, besides the optical system, or lens plate, with its lens and its prism, the horizontal septum and the hinge of the lens plate.

In constructing my optical viewing and screening instrument in the form in which I have embodied it, I first preferably provide a base 1, and affix upon the same two parallel vertical rack-posts 2, 2, formed with rack-teeth 3, 3, upon their rear faces. Surrounding these posts and vertically slidable thereon, are tubular sleeves 4, 4, immediately back of which is mounted a transverse shaft 5, provided with a knob 6 at one end, and having mounted thereon two pinions 7, 7, extending through the tubular sleeves 4, 4, to engage the rack-teeth 3, 3, upon the posts inside said sleeves, whereby turning the knob 6 and the shaft 5 thereby, will raise or lower the sleeves 4, 4 upon said posts.

These sleeves 4, 4, are firmly attached by welding or any other desired means to shoulders 8, 8 upon the face of an angled plate 9, of metal or other suitable material, the said shoulders being located thereon near the bottom thereof, within each side edge thereof, and contacting the sleeves a little above their lower ends. The said sleeves are similarly attached at their upper ends to braces 10, 10, connecting them to the said plate 9. Thus the plate rises and drops with the sleeves.

This plate 9 is now, though not necessarily, made by me substantially rectangular in shape, somewhat longer than broad, and while usually integral, is angled across a line which may be its transverse median line, to form two sections 11 and 12. The upper section 11 ranges vertically, substantially parallel with the posts 2, 2 and the sleeves 4, 4, and perpendicular to the base 1 (this being a descriptive explanation indicating its relation to other elements of the invention, not a limiting definition). The lower section 12 is angled downwardly and forwardly from the said median line, at an angle of 20° from the perpendicular and hence from said upper section 11, and where the upper section 11 may be held by the connecting braces 10 an appreciable distance forward of the said section 11, the lower edge of the section 12 may contact the said sleeves. This is shown in Figures 1 and 2, and indicated in Figure 7, which shows the angled plate detached, and the median line is also indicated in Figure 5.

In the centre of each section 11 and 12 of the plate 9 is formed a transverse slot 13 and 13a respectively, rectangular and elongated in shape, with a central vertical break or short bar 14 and 14a respectively bisecting each slot. This is shown in Figure 9, the dotted lines encircling the slots being placed to indicate the positions of the test targets, and the size thereof relatively to said slots and the plate 9. In setting up these targets upon the plate, I first construct twin ring gears 15 and 16, externally toothed on their edge peripheries, and rotatably supported upon the rear face of the sections 11 and 12 respectively, in segmental or arcuate guides 17, of any desired number, which are detachably secured to the said sections of the plate 9, in such manner that the gears travel in the circular path around the slots 13, indicated by said dotted lines.

The ring gears are the target carriers, rotating the target assembly or transparency (commonly in this art such transparencies or translucent films within translucent covering plates are appropriately termed sandwiches), comprising holders, which are made in the form of glass disks 18 and 19, and receive and retain the disk target 20 between them, on which the test units are displayed. The disks 18, which lie next to the plate 9 and therefore nearest to the optical system at front, later to be described, are made of clear glass, while the rear disks 19, which first receive the illumination from a bulb behind the same, as will also appear later, are made of diffusing ground glass. The test target 20, which is held between the glass disks 18 and 19 of each target assembly and all three secured by clips 22, is usually a photographic film, designated on the drawings by the said reference numeral 20 on which are printed the various units comprising the series of tests. The ring gears are rabbeted to receive the target assembly, held by clips 23.

In Figures 3 and 4, showing the target and said disks, I indicate the test-units or test images upon said target only diagrammatically, as the particular images employed are no inventive part of my instrument, which is designed to use whatever test images are customarily employed in the art, in these stereoscopic eye-testing devices, and I print upon the target 20 a selected group of such units or images, of which in Figure 3 I indicate seven pairs indicated by pairs of units 1, 1, to 7, 7, spaced in a circular series, each pair being a recognized and customary stereoscopic eye-testing image or test-unit. The test images on the near vision target, and those on the distant vision target, are customarily the same group on one target as on the other, but different sets or groups or series of these test images may be used on the respective targets if desired.

Any number and kind of tests adequate to determine the facts desired respecting the vision of the various subjects, enough to screen off those not needing further examination or treatment, and to check off the details of the cases of the proportion selected for reference to optometrists or others, may be employed in this invention, and such tests may be altered and newer ones substituted from time to time in the progress of optical science. But in stereoptical tests, it is of course obvious that mating units or twin images are displayed, and seen by the right eye and by the left eye, simultaneously and separately. And to effect the results sought for in an apparatus of this kind, to the highest degree of accuracy and efficiency, it is important that these twin images be arranged upon the target, and viewed through the instrument, the most advantageously. In this invention, I have devised a target assembly adapted to display the twin images each pair at exactly the same distance apart, and that distance exactly the inter-pupillary distance of six centimetres from centre to centre, plus or minus a small percent.

In the embodiment of my invention illustrated, the test target, as shown in Figure 3, contains seven tests, hence seven pairs of mating images, which in said figure are marked with mating numerals at the circumference of the target disk 20, for clarity, although in practice no such numerals are so marked thereon. In the drawing, the tests, and the fact that they are mated or paired, is indicated diagrammatically, but it will readily be comprehended therefrom, that a semi-revolution will display all the tests upon the target, and that if, as shown, there are seven tests, seven pairs, fourteen items distributed around the area of the disk in circular order, the rotation of said target disk is arranged to move a motion-segment or distance of one seventh of the periphery of the said semi-circle at each change of unit test displayed, or one-fourteenth of the circumference of the entire disk. Display of a test unit pair consists in bringing any such pair horizontally across the diameter of the disk in registry with the slot 13 of the plate 9 behind which it rotates, through which slot it may be viewed as hereinafter set forth.

From consideration of the two separate angles of the upper and lower sections 11 and 12 of the plate 9, the upper exactly vertical and the lower subtending a forward angle of 20° therefrom, it will be noted that the upper ring gear or target carrier 15, being likewise vertically set, will display its target accordingly, while the lower ring gear or carrier 16 will display the lower target at the said angle of 20°, matching not only the lower section 12 of the plate 9 but also thus registering with the slot 13 thereof. The two ring gears, mounted in their guides 17, mesh at their meeting point at the median line where the plate 9 angles off from the upper section to the lower. At one side of the plate 9 (in the device as shown, just beneath the right side of the lower ring gear 16) there is mounted a stub-shaft 24, projecting through the plate 9 from front to rear, with a knob 25 on the front outside end, and a pinion 26 at the inside end, meshing with the lower gear 16 each rotating in opposite directions. By means of this knobbed shaft and pinion, the whole gear system may be manually rotated, whereby the operator of the instrument may successively display the test units of the targets upon the upper and the lower disks, respectively through the slots 13 of the upper and of the lower sections 11 and 12 of the plate 9.

To ensure that each target will be rotated in equal segments or distances of motion, so as exactly to display the next equi-spaced test unit on the same disk, I provide a detent device of not unusual mechanism, consisting of a small rectangular tube or cylinder 27, shown as mounted upon the front of the plate 9, with a spring-actuated piston 28 therein, which projects a roller-ball 29 through the plate into one of fourteen notches, holes or indentations 30 formed in the front face of the periphery of the lower ring gear or target carrier 16 which is in contact with the said plate 9; or such other number of notches as may accord with whatever number of test units are displayed by the target, namely, double such number in the device shown.

Upon the front face of the upper gear 15, which is in contact with the plate 9, I affix along its periphery a series of indicia 31, which may be numerals or letters, and in the form of my instrument illustrated are fourteen in number, representing the seven tests diplayed upon each target, one such set for "near" viewing and another such set for "distance" viewing. These indicia are located so as to agree and correspond in distance apart, with the test-unit spacing upon the target 20 which is carried by the upper carrier 15. In the rotation of the gear, these indicia are successively visible at the front of the apparatus through an aperture 32 made in the plate 9 at a convenient point where no other elements of the device obscure the view from the front. While there are but seven test units on the upper target, I place fourteen indicia upon the said upper gear, for it is part of my invention, as mentioned above and hereinafter more fully explained, to display said seven tests first for "far" vision, and secondly for "near", and as the two ring gear target carriers are meshed together, the indicia may all be located upon one gear, to appear in such succession as will accord with the display of the units in the order of their appearance, in the unique manner devised in this instrument.

At the junction of the two sections 11 and 12 of the angled plate 9, or the median line thereof, I secure to the rear of said plate a platform 33, having a transverse flange 34 by which it is attached, and supporting braces 35 beneath. The sides of the platform are inclined to a somewhat narrowed rear edge 36. Upon the upper surface of this platform is mounted an electric light bulb 37 projecting upwardly, and on the under surface of said platform is a similar light 38, projecting downwardly; though any other acceptable arrangement of the bulbs may be arranged. Wires 39, 41, lead to said bulbs and to a single-pole double-throw switch 40, shown as set adjacent the upper ring gear target carrier 15, which switch, however, might equally well be located to operate in connection with the lower ring gear, and otherwise arranged conveniently to its purpose. From this switch 40, the said wires 39, 41 lead back to a source of electric supply, and as designed, are equipped with a plug, not shown, at the end thereof, to plug in on a wall-outlet of a building, and are provided with a simple on and off switch 42.

The function of the switch 40 is to switch the current from the upper bulb to the lower, and vice versa. I provide means for doing this automatically in synchronism with the completion first, of the display by the rotating target, of the seven or other number of test units upon one of the said targets, upper or lower, and again upon the completion of the display of the series of test units upon the other target; and specifically, in the construction illustrated and described herein, respectively after the display of the seven units upon one target for "distance" viewing, and again after display of the same series upon the other target for "near" viewing, the especial purpose whereof is for accomplishing an important part of the work of my invention, in an automatic and wholly unique way with consequent results which will hereinafter be fully set forth. To this end, I secure to the upper ring gear 15, near which the switch 40 has been set, a nearly semi-circular cam segment, 43, with rounded ends for smooth engagement, which is affixed thereto at such circumferential position and in such adjusted relation to the locations of the test units upon the target 20 of the upper carrier, that at the moment where the seventh unit has been displayed, the gear having completed a semi-revolution, the cam segment 43 will in the continued rotation of the said upper gear 15, engage the spring-projected pushrod 44 of the micro-switch 40, and actuate it to shut off current from whichever bulb is lighted, and switch it to the opposite bulb. This illuminates the target on which the light of said bulb shines, at the instant that the other bulb is extinguished; and while the upper gear and target carrier continues to rotate, as well as to rotate the meshing lower one, only the target that is illuminated will be displayed, owing to the combination of the various elements of the invention mutually contributing to its functions, particularly in this respect, as will further appear.

At the upper edge of the plate 9 is hinged the rear hood or housing 45, which is about as long as said plate, as shown, and with its sides 46 bent to lie against the rear of the said plate, and narrowed rearwardly to fit tightly the shape of the platform 33; all of which is for enclosure of the rear of the apparatus during illumination of the targets, and rotation of the target carriers, and may be modified in details as desired, provided that its functions are maintained.

Upon the front of the plate 9, I affix or otherwise mount in a manner to be permanently or removably attached thereto, a quadro-compartmental tunnel or viewing tube 47 about 33 cm. long. This element is constructed with a preferably flat horizontal roof 48, two flat sides 49, parallel and lying just within the rack-posts 2, 2, the said sides being straight and nearly horizontal at top and inclined at bottom, so that these sides are considerably deeper at rear, where they are secured to the plate 9, than at front. Their rear edges 50 are angled to correspond with the angle of the plate 9, and fit tightly against both the vertical upper section 11, and the forwardly angled section 12, of said plate. The floor 51 of the tunnel is secured to the inclined under edges of the sides 49, hence follows their incline to project upwardly toward the front of the tunnel, and thus decrease its area vertically from rear to front. This tunnel is mounted upon the plate 9 with its roof 48 immediately above the slot 13 in the upper section 11 of the plate 9, and its floor 51 immediately below the slot 13 in the lower section 12.

Centred in the tunnel 47 is a vertical longitudinal partition or septum 52, which is fastened at rear to the plate 9 in contact with the short bars 14 which bisect the slots 13 in the two sections of said plate, a vertical septum being of course essential in a stereoscope. Likewise centred in the tunnel across the vertical septum is a transverse horizontal partition or septum 53 also ranging longitudinally from end to end of the tunnel. Thus the tunnel is divided into four compartments, of which the two upper ones connect with the slot 13 in the upper section 11 of the plate 9, and the two lower compartments with the slot in the lower section 12. At the front edge of the tunnel, its floor 51 is provided with an upraised central portion or rounded septum to form a nose recess 54 open at the bottom but closed off at top and sides from the several compartments of the tunnel.

There is hinged to the roof of the tunnel at its front edge, a cover plate 55 carrying the optical system through which the subjects view the targets displayed at rear. This plate or "ocular" is angled across its median line like the plate 9, with its lower portion projected forwardly to subtend an angle of 20° from the upper portion, which is wholly vertical. Its centre is cut out to correspond with the nose recess 54, and at either side thereof are formed apertures 56, or eyeholes. The median line of the said hinged ocular divides these apertures into upper and lower halves, both semi-circular. In the upper halves I insert lenses 57 through which the test target is viewed for distance vision tests. In the lower halves I insert prisms 58 for near vision tests.

The lenses are plus lenses of 2.75 diopters, straight-edge horizontal, on the lower edge where they abut upon the top edge of the prisms, and this 2.75 D. dimension may be subject to a slight variation either way, of not over 5%, if the exact 2.75 D. dimension is not available at a given moment of supply or replacement. The prisms are a pair of 7-prism-diopter power, base out. The length of the tunnel is 33 cm., and adding to this the average 2 cm. of centres of rotation of the eyes from the lens 57, the total length offered by the instrument is, in the embodiment of my invention illustrated and being described, 35 cm. The distance effect of 35 cm., coupled with a pair of plus lenses of 2.75 D., is that of 6 m., or what is termed optical infinity. As the actual distance of 35 cm. is also good reading distance, the two prisms 58, of 7-prism diopters, without other assistance, cover the near visual test. The cover plate or ocular, is fastened with clips 59 at the sides of the front edge of the tunnel to hold it closed.

It will be noted by those accustomed to the use of older or present styles of such instruments, that I do not combine lenses and prisms, as a hybrid ocular, simultaneously acting integrally as a unit, for either distance vision or near tests. Having arranged my near-vision test at the same optical distance as the exact physical distance allowed by the structure of the invention, namely, approximately 35 cm., I use only convergence base-out prisms for the near test; and only on the near test is convergence necessary in my newly-invented instrument. And I have in the upper section of my ocular or eye-piece for distance test, placed the target at approximately the same 35 cm. distance, and using only one section of the said ocular for viewing distance, I fit that upper section with a plus lens of 2.75 D., which converts that 35 cm. to optical infinity (6 m.), and does not employ any prism, power in that section. By making my ocular in upper and lower sections, with each section semi-circular, the upper section is used for distance and never for near vision, while the lower section is used for near vision and never for distance vision. Thus my actual viewing of the targets for near vision is with prisms only, and for distance with plus lens without prism power. In some of the previous machines which present the same ocular to the near test as they do to the distance test, both required optical factors, prisms and plus lens power, are combined in the same glass, and this means the presence at either and both tests, of a factor needed by such other machines, but in my instrument not needed, and I believe in practice found to be a source of error, in said previous machines, or some of them. In this invention, I have eliminated to the utmost a number of factors of extra motions and operator-controls, but particularly the interposition of artificial elements between the eyes and the tests on the displayed target, since these create sources of error. Among this latter type of factors, the use of combined lenses and prism power is a prime offender, and in my invention is quite unnecessary. First, I construct the target with the mating twin images 6 cm. apart, then construct the tunnel passages 33 cm. in actual distance, plus the 2 cm. centres of rotation or a total of 35 cm., so that there is a natural reading distance of 35 cm. combined with a natural interpupillary distance of 6 cm. in said target images, hence no requirement for, nor even possibility of using, any refraction in addition to the prisms of calculated power of convergence of the images; and as to the distance test, since the target test units are, as just stated, given the right natural separation, no convergence is required to be changed by prism, the 2.75 D. refraction is exactly right to convert an, actual distance in the instrument of 35 cm. into a viewing distance element of optical infinity.

Specifically, prisms also add sources of error in disclosing or failing accurately to disclose and appraise various defects, including myopia on the distance test, which should above all be dependable and accurate in such tests if the instrument is to be of a high grade of service for its intended purposes. Thus the ability of this device to eliminate need for prisms there, is important, and no attempt should be made to have them incorporated into this apparatus, as it is to be understood why they are intentionally omitted, and the benefit thereof.

The structure of the apparatus being, I believe, sufficiently clear from the foregoing description, I now proceed to the manner of operation of the invention. The subject is placed at the ocular or eye-piece. Since the somewhat revolutionary changes in principle and construction represented in this device, from the previous ones of the art, eliminate much operator control and target-submission motions, it is merely necessary in advance to inform the subject that he is to look at what he sees, and report it as asked. The instrument having been plugged into a light socket, and the target carrier gears manipulated by the knob 25 to set the upper target assembly at the indicium or numeral 1, as seen from the front of the device through the aperture 32 in the plate 9, with the light current directed through the wires and the switch 40 into the upper bulb 37, the light of said bulb will illuminate the target 20 of the upper carrier, and the whole sandwich being a transparency, the central portion thereof which bears the primary test unit labelled 1 on the ring gear, will shine out through the slot 13 in the plate 9, in distinct and conspicuous display. As the plate 9 shuts off all of the target except the twin images illuminated and visible through the slot 13, only this unit is presented to view in the first instance. The subject is looking through the ocular or eye-piece. Because of the quadro-compartmental construction of the tunnel, there is a pronounced optically different presentation from the usual or previous, in that first, the twin images are not only simultaneously presented separately to each eye, as usual, by the intervention of the central vertical septum or partition 52, but by reason of the horizontal septum or partition 53, which directs the gaze through the passage in which the test unit is being brilliantly illuminated, the subject automatically views that unit only, and sees it only through the proper lenses, if the upper passage, or prisms, if the lower. And what is almost, though not quite as important, since the lower light bulb is extinguished, and the platform 33 shuts off any light from the upper bulb to anything below it, and the rear housing shuts off external light wholly, the horizontal septum 53 suhts off any light into or from the lower sections of the quadro-compartmental tunnel, and no portion of the lower target 20 on the lower target carriers beneath the platform can be seen even in faint degree.

The value of this will at once be seen when we consider the further operation of the instrument. The operator does not direct the subject, to look up, and later to look down, to the right or to the left, but the instrument displays only what he is asked to view and report. The unit number 1 having been checked on the subject's test card, the operator turns the knob 25 and rotates the upper gear to register the second test unit with the slot 13, checks that, and so on consecutively until the total number of seven units are displayed and checked, without confusion or need of explanations because of the sole momentary display of one unit and shutting off of all else. As each new unit is brought into sight, the new numeral appears to the operator through the aperture 32 in the plate 9 and the click of the detent confirms the change aurally. If for any reason it is desired to review a unit already seen and checked, the gear system is reversible, and may be turned back without altering any relative positions of the elements of the displaying mechanism or the order of display, and when turned on again, the previous positions of the parts is restored by rotating the gears to where they were before.

What has been seen is the distance test. In natural use and focusing of the eyes for distance sight, one always looks on a generally horizontal straight ahead plane. In my quadro-compartmental tunnel system, the subject looks straight ahead on a substantially horizontal plane, and sees all through a slot in line with the upper section of the tunnel, which as stated, follows a horizontal path. The operator may mention to the subject that he is so viewing for distance, but the instrument in any case makes him so view, because nothing else is visible. When the seven units or whatever are the number of such displayed on the semicircular rotation of the target, are completed, and the operator continues turning the knob, automatically the cam segment 43 on the upper ring gear strikes the push-rod 44 of the switch 40, and switches the light from the upper bulb to the lower. This extinguishes the light above, darkens the upper target just seen, and illuminates the lower target, which is set to display the first test unit upon the lower target, numbered 8 upon the numerals of the still rotating upper gear, but being a duplicate of the number one test of the upper gear and target, displayed in opposite circular order, if the instrument is equipped to repeat the first seven tests under "near" vision conditions, without altering the actual nature of said series of seven otherwise. This automatic darkening of the upper target, of the upper section of the quadro-compartmental tunnel, the concomitant illumination of the lower target, and the sole display of its centrally positioned test unit on the said lower target, will cause the eyes of the subject to drop instinctively to the said lower target and its test unit appearing in full illumination through the lower slot 13, and it does not require the words of the operator to inform him that he is to change his viewing from the upper lenses with their distance refraction, to the prisms of the lower half of the ocular or eye-piece, through which he is now viewing the test unit in very much as natural a manner as though using no glasses at all, since the prisms alone simply act for such sufficient convergence as essential. As this lower section of the instrument, the viewing through the prisms of it, constitute a test at simple reading distance, of what amounts to reading, and as in such reading usually one's eyes glance diagonally downwardly at the reading matter, held slightly up to meet such glance at a perpendicular thereto, this invention first, bends the plate 9 at an angle to give its lower section a 20° upward angle, second, mounts the lower ring gear and target in contact therewith at a like angle, and slants the lower section of the tunnel upwardly to correspond, and angles the ocular so that the prisms 58 also subtend a forward angle of 20° to register with the other elements of the lower target display and read downwardly upon said lower target. By this invention, it will be seen that I present two duplicate targets at the correct angle for each, by offering the subject one, for distance at true vertical, and a second one exactly angled at 20° for reading.

The several elements of the invention which work for accuracy, as above defined, for absence of obscuration, blurring and false diagnosis, and for avoidance of too great or repeated operator control and constant instructions, directions what to do next, how to look and what to do and not do, also add to the ease and rapidity of conduct of the screening operation. This is of prime importance in handling thousands of subjects in one institution, factory, college, and by cutting down on the time factor involved in the operation in its elements other than the valuable proportion thereof devoted to the moments of actual viewing and reporting of the same, more time may be assigned to this essential time-use and greater efficiency achieved, as indicated in the preamble hereof, as an objective. The height of the eye-piece, adapted to varying human dimensions, may quickly be adjusted up or down and back again, by the rack-posts 2, 2, and the knob and pinions.

It is particularly to be noted that in these screening tests, myopia has been found to be a major condition among subjects, and the distance tests the major means of disclosing it. By my invention being able to eliminate prisms from the distance viewing, this removes also a likewise major source of errors in dependable and accurate myopia disclosure. It is also notable that on the near test, though to a lesser degree, we gain in dependability in disclosure and appraisal of hyperopia and presbyopia by eliminating the sources of error customarily existent where lens power is introduced in conjunction with prism power, as is done with so much in the prior art.

It will be noted that my newly-invented eye testing instrument first, sets both the near and the distance vision targets at the same physical distance of 35 cm. from the ocular; second, provides a fixed ocular which views the near tests through prisms only, without any need for lenses, as this stated distance is the natural reading distance, and views the distance tests through plus lenses of approximately 2.75 D. to extend the 35 cm. optically to 6 m.; third, forms said ocular with upper eye-piece sections for so viewing the distance tests straight ahead horizontally, and lower sections angled forwardly 20 degrees to view the near tests diagonally downwardly; fourth, sets the distance target disk in line with the upper section of said ocular, and the near target disk immediately below the distance target on a forward angle of 20 degrees to be in line with the lower section of said ocular; fifth, provides a four-compartmental tunnel with not only the vertical septum usual to stereoscopes, but also a horizontal septum forming a horizontal path to the upper target and a diagonal path or passage to the lower target (from upper ocular-section to upper target and from lower ocular-section to lower target), excluding vision to either through the wrong section; sixth, gears the target disks rotatably together so that after one has completed its display of test units the other target will automatically begin to display its test units; seventh, provides an automatic light system which illuminates the upper passage or path to the upper target while it is presenting its test units, darkening the lower passage, and both darkens the upper passage when its display of its units is completed and simultaneously illuminates the lower passage and target.

The automatic nature and operation of the invention will be observed, both in its instant presentation of the second target carrying the second set or series of the units for the change directly from the distance tests at one slot, to the near tests at the other; in its instant darkening and extinguishment of the one set just before the other appears; in its provision of the horizontal septum and consequent passages which show the tests on natural horizontal and downwardly diagonal paths where the subject naturally looks for each; and in the angled eye piece which when the illuminated test at the slot draws the gaze exclusively there, and the eye drops to the diagonal or rises straight to the horizontal, causes said eye, as shown in Figure 1, to view the test through the lens of the prism, as required; all being practically automatic.

The foregoing specification and the drawings describe and show the embodiment of my invention for the purposes intended. It will be obvious to those skilled in this art that there are elements in it of basically novel principles, together with features of construction which operate mutually in an invented devisement toward the production of an objective for this, and by adaptation, for other purposes, which features, or their equivalents, are necessary to perform the functions set forth; and that there are minor details of construction which may be varied in practice and in the progress of the invention, during the term of this patent; and I thus contemplate it in all of its broad and specific aspects, as covering all exemplifications of its principles, its elements, and all modifications thereof, within the purview of my said invention, as defined in the appended claims.

What I claim is:

1. An eye-testing apparatus comprising target carrier means, targets carried thereby and bearing target test-units thereon, said carrier means being rotatably mounted to rotate the targets therewith and move the target test-units successively to viewing position; means for moving target test units to one position for distant vision and to a different position for near vision, means for illuminating the target test-units to be viewed, means governed by the target carrier means for changing said illumination to the near vision position after the viewing of the distant vision target test-units is completed, by the rotation of the near vision target test-units into viewing position; and an eye-piece mounted at the front of the apparatus at an actual and substantially equal physical distance from the target test units to enable viewing of the near vision target test units at natural reading distance and embodying in the same eye-piece different viewing means for respectively the near vision target test-units and the distant vision target test-units, the means for the near vision target test-units being base-out prisms without any plus lens power, and the means for viewing the distance vision target test-units being plus lenses without prism power, of a plus power to optically project the image to appear at infinity, the said eye-piece being formed with separate sections through which the eyes of an observer may without changing his position or that of the eye-piece, view whichever target test-units are illuminated at the viewing moment.

2. An eye-testing apparatus comprising target carrier means, targets carried thereby and bearing target test-units thereon, said target carrier means being rotatably mounted at the rear of the apparatus to rotate the targets therewith and move the target test-units continuously and successively to viewing position; means whereby the target test-units are presented in groups for distant vision and for near vision respectively; means for successively illuminating the distant vision group while concomitantly darkening the near vision target test-units; said means being governed by the target carrier means; means upon said target carrier means whereby the completion of rotation of the target bearing the distant vision target test-units shuts off the light from said distant vision group and starts the illumination of the near vision group; an eye-piece mounted at the front of the apparatus at an actual and substantially equal physical distance from the targets, this distance being the natural normal reading distance for near vision and tests thereof; the said eye-piece embodying different viewing means respectively for the distance vision groups and for the near vision groups, the means for viewing the near vision groups being base-out prisms without added plus lens power, and the means for viewing the distance vision groups being plus lenses, these being of a plus power sufficient to optically project the image so that it appears at infinity; the said eye-piece being formed with separate sections through which the eyes on an observer may without changing his position or that of the eye-piece, view whichever target test-units group is illuminated at the viewing moment; and means between the said eye-piece and the target test-units providing a horizontal path of vision from the distant-viewing sections of the eye-piece to the targets, and for providing a diagonally downward path of vision from the near-viewing sections of the said eye-piece.

3. An eye-testing apparatus comprising targets bearing target test-units thereon, means for presenting said targets with their test-units to view of an observer-subject being tested, and for so presenting said target test-units in a group for distance vision and in another group for near vision viewing, both at an actual and substantially equal physical distance of approximately 35 cm. between point of viewing and said targets; a binocular eye-piece located at the front of the apparatus at approximately said 35 cm. distance from said targets, formed with two sections separately viewable therethrough by the one pair of eyes of an observer, each section equipped with different viewing means, respectively for near and for distant vision viewing, the near vision sections having base out prisms for convergence without any added plus lens power, to view said near vision target test-units at said actual physical distance of 35 cm., and the distant vision sections having plus lenses without added prism power and of a plus power to project the image to appear at infinity.

4. An eye-testing apparatus comprising target carriers rotatably mounted, carrying targets bearing target test-units thereon, in separate groups for near vision viewing and for distant vision viewing, respectively, both groups set at the same approximate distance of 35 cm. from the viewing position at front of the apparatus, the distant vision group of target test-units being in position to be viewed on a horizontal line, and the near vision group being located immediately beneath the same at a forward angle of approximately 20 degrees; and a binocular eye-piece located at the front of the apparatus at said distance of 35 cm. from the target test-units, and formed with two sections, upper and lower, the upper being equipped with plus lenses of a plus refractive power sufficient to project the image to appear at infinity, and being set to view on a horizontal line said distant vision target test-units, and the lower sections being equipped with base out prisms and no plus lenses, to view the near vision target test-units at the natural physical distance of 35 cm. and being set to view them on a diagonally downward line; and means governed by the target carriers for illuminating the distant vision group of target test-units and concomitantly darkening the near vision group, upon the completion of the rotation of the near vision group, and for illuminating the near vision group and darkening the distant vision group upon completion of the rotation of the said distant vision group of target test-units.

5. In an eye-testing apparatus, the combination, with means for presenting target test-units respectively for near vision viewing and for distant vision viewing at a common uniform physical distance of approximately 35 cm., and for presenting said test-units in separate groups for distant and for near vision viewing successively, physically at said 35 cm. actual distance; of a binocular eye-piece mounted at the front of said apparatus at approximately said distance of 35 cm., and formed with two sections, respectively to view the near vision group only, and the distant vision group only, separately, successively and both by an observer at said eye-piece without change of his position or that of the eye-piece; one of the sections being equipped with base out prisms without any added plus lenses, to view the near vision test-units by natural reading, and the other section being equipped with plus lenses without prisms, and of a plus power to project the image optically to appear at infinity.

6. An eye-testing apparatus comprising rotatably mounted targets bearing target test-units thereon in pairs fixed at approximately the natural interpupillary distance apart of 6 cm., means forming part of the mechanism of the apparatus for supporting and maintaining the said targets at a natural actual physical reading distance of approximately 35 cm. from eye-piece to targets, and for presenting alternately and successively at such distance one group of target test-units for near vision viewing at the said natural distance and another group of target test-units for distant vision viewing; and an eye-piece at the front of and forming part of the mechanism of the apparatus, located in a fixed position at said 35 cm. from the targets, to view the said targets from and through said eye-piece without change of position of the eye-piece or of the observer-viewer thereat, from the same uniform distance; and comprising a pair of plus lenses without prisms, and of a plus power to project the image optically to appear at infinity, and a pair of prisms without added plus lenses, whereby the near vision target test-units are read at natural distance with only convergence, and the distant vision test-units are read by plus lenses without prisms and without the interposition of any additional factor between the eye and the target.

7. An eye-testing apparatus comprising target carriers mounted to rotate, and carrying targets bearing thereon target test-units one target bearing test-units for distant vision reading, and mounted above a second target bearing test-units for near vision reading, each located at approximately 35 cm. from the eye-piece of the apparatus to the targets; and a binocular eye-piece mounted at the front of the apparatus at said distance, having upper and lower sections one laid upon the other, the upper sections being aligned horizontally with the upper target and the lower section being aligned with the lower target, said upper section being equipped with 2.75 D. plus lenses to project the image optically enough to appear at infinity, and the lower section being equipped with base out prisms for convergence, to read the near vision target test-units at natural 35 cm. reading distance without any added plus lenses.

8. An eye-testing apparatus comprising target carriers, mounted to rotate and carrying targets thereon bearing target test-units thereon, the said test-units being presented for distant vision in one group and for near vision in another group, said targets being located at natural reading distance of approximately 35 cm. from the front of the apparatus to said targets; an eye-piece mounted at the front of said apparatus at said distance, formed with sections respectively containing separate and distinct means for viewing only distant vision tests alone, and for viewing near vision tests alone; a tunnel between the said eye-piece and the targets, provided with both vertical septums and horizontal septums to form two separate passages, one aligned horizontally with the distant viewing section of the eye-piece and the distant vision group of target test-units, and the other aligned diagonally downward from the near viewing section of the eye-piece and the near vision group of target test-units; and means governed by the target carriers for illuminating the distant vision group of target test-units successively at the target end of the horizontal passage, and concomitantly shutting off the illumination from the near vision target test-units, at the target end of the diagonal passage, and for illuminating oppositely the near vision test-units and shutting off the illumination of the horizontal passage, upon the completion of the presentation of the distant vision test-units.

9. An eye-testing apparatus comprising means for presenting target test-units for near vision viewing and other target test-units for distant vision viewing, and for so presenting such target test-units singly in one group for near vision and another group for distant vision; a plate on which said target test-units presenting means is mounted, provided with slots therein at one of which the distant target test-units are presented, and at the other the near target test-units are presented; the portion of the plate containing the distant target test-units slot being vertical, and the portion of the plate containing the near target test-units slot being angled forwardly about 20 degrees; a quadro - compartmental tunnel mounted between said plate and the front of the apparatus and formed with a vertical partition and also a horizontal partition, which divides said tunnel into horizontal and diagonal passages, which respectively connect with the distant target test-units slot and the near target test-units slot; a binocular eye-piece in each side of which is an upper semi-circular plus lens without prisms, for distance viewing, and a lower semicircular base-out prism without added plus lenses for near viewing, and the upper portions of said eye-piece being located at the front end of the horizontal passage and the lower portions of said eye-piece being located at the front end of the diagonal passage; and means for illuminating the target test-units at the slots as they are presented for viewing.

10. In an eye-testing apparatus the combination, with two targets bearing thereon target test-units, mounted upon a plate in said apparatus one above the other, said plate having two slots in it one above the other, and centrally angled to form two sections one above the other, the upper section being vertical and the lower section inclined forwardly, each target being mounted to rotate and set so that when one has completed presenting its target test-units, the other commences to present the ones upon it; a platform between the two targets, two illuminating bulbs mounted one above the other on opposite faces of said platform, and connected to the rotating targets to be lighted thereby to illuminate the upper target when it is presenting its target test-units and to darken the lower; and to illuminate the lower target when the upper is finished presenting its target test-units aforesaid; of a tunnel mounted in front of said targets, having two longitudinal passages therein one above the other, the upper passage being arranged in horizontal line with the upper target, and the lower passage being arranged diagonally downward from the eye-piece to the lower target; and an eye-piece having separate sections in the front thereof, one above the other, the upper sections scanning the upper passage of the tunnel and the upper target, and being provided with lenses to view target test-units through said upper passage, without prisms, and the lower sections scanning the lower passage and the lower target, and being provided with base-out prisms without added plus lenses lens power.

11. An eye-testing apparatus comprising targets bearing thereon target test-units and mounted upon two ring gears rotatably mounted upon the upper and lower sections of an angled plate fixed in the instrument, the lower plate-section being angled forwardly, and the gears intermeshing at central line of said plate whereby they rotate together, means upon the instrument to manually rotate said gears; illuminating means back of the targets, means upon one of the gears whereby at each semi-revolution it actuates the illuminating means to light up one of the targets and darken the other, the angled plate being provided with two slots, upper and lower, through which are respectively presented the target test-units carried by the two targets, said target test-units being arranged on said targets in circular series so that each such semi-revolution of one gear displays the whole area of one target and brings the opposite gear into position to deliver its series of target test-units; a quadro-compartmental tunnel formed at back to fit upon the angled plate, with its roof above the upper slot and its floor beneath the lower slot, and provided with two septums to form its compartments, one the usual vertical septum for stereoptic purposes, and the other a horizontal septum to form two superposed bi-sected passages, the upper one extending horizontally and the lower extending diagonally downwardly; and an eye-piece comprising two pairs of semi-circular elements mounted in the apparatus in front of the tunnel, for viewing respectively the said targets through respectively the upper and the lower passages of said tunnel, the lower portions of the eye-piece being angled forwardly with the upper portions vertical, and respectively connected to the upper and lower passages of the tunnel, to view through the same.

12. In an eye-testing apparatus, means for presenting eye-tests comprising targets bearing thereon target test-units and mounted upon two ring gears rotatably mounted upon an angled plate whereon the two gears lie respectively against the two sections thereof, upper and lower, the lower section being projected forwardly and the gears meshing at the central line of said plate, whereby they rotate together, means upon the instrument to manually rotate said gears; illuminating means back of the targets, means upon one of the gears whereby at each semi-revolution it actuates illuminating means to light up one of the targets and darken the other, the target test-units being arranged in circular series thereon so that the said semi-revolution of one gear displays the whole series on said target and brings the opposite gear into position to display its target test-units; the angled plate being provided with two upper and lower slots, through which are respectively displayed the target test-units of the said targets; and an eye-piece mounted at the front of the apparatus and formed with two independent elements of which one is mounted and arranged to view target test-units through the upper of said slots, and the other to view tests through the lower of said slots, and each respectively to view therethrough one of the targets and not the other.

13. An eye-testing apparatus comprising targets bearing thereon target test-units mounted upon two meshing ring gears rotatably mounted in the instrument and the target test-units on the targets being arranged in circular series so that a semi-circular revolution of one gear operates for the display of the whole series on said target on said gear, and the following semi-revolution of the same target and its gear actuates the opposite gear and target to display all the target test-units thereon; an illuminating means mounted to illuminate each of said targets alternately while it is presenting its target test-units and darken the other; a cam upon one of the gears and a switch adjacent the said gear on which the said cam is adapted to operate to change the light from one target to the other after the gear has completed the said semi-revolution which has displayed one series and is about to make the remainder of the whole revolution during which the other target will be rotated and its target test-units displayed; and an eye-piece mounted at the front of the instrument an appropriate distance from the targets, formed in two sections one of which is equipped with optical elements to view target test-units at a distance and the other is equipped to view target test-units at near vision.

14. In an eye-testing apparatus the combination with a supporting means, adjusting means whereby the height of the whole instrument may be raised or lowered without altering the mutual relations of its parts by said adjustment, two targets bearing thereon target test-units mounted upon ring gears which are rotatably mounted one above the other, a plate on which said gears are carried, said plate being centrally angled to form an upper section and a lower section projected forwardly, a platform fixed between the two targets, an illuminating means back of the targets embodying two bulbs, one on top of the platform and one below it, a switch on said angled plate, means on one of the gears for pushing the switch at a semi-revolution, to darken one bulb and light the other, the angled plate having two slots therein, each located to permit viewing of the respective targets when illuminated by a bulb, a tunnel at front of said slots, a vertical septum and a longitudinal horizontal septum in said tunnel which divides the same into upper and lower passages; and a housing at back of said targets; of an eye-piece mounted at the front of said tunnel and forming part of the apparatus, and formed of two sections equipped respectively with elements to view target test-units at distance, in one section, and elements to view near target test-units in the other section, said sections being respectively set to view a target through the upper passage for distance, and a target through the lower passage for near vision target test-units.

15. An eye testing apparatus comprising two targets bearing target test-units thereon and a plate in said instrument on which the targets are rotatably mounted in such interrelation that one target presents its target test-units first for distance viewing and the other follows with its target test-units for near vision viewing, a platform between said targets on which are fixed two light bulbs back of the targets to illuminate the same, a switch arranged to change the light from one bulb to the other, means in connection with a target to actuate said switch at a semi-revolution of the target, the plate on which said targets are mounted being centrally angled, to form an upper vertical section and a lower forwardly projecting section, each having slots therein, through which the target test-units are displayed, manually operated means for rotating the targets, detent means limiting the rotation to equal motion-distances, means for adjusting the height of the instrument whereby the relations of its elements are not altered by such adjustment, a series of indicia rotated in connection with the targets, designating the order of target test-units of both targets; a tunnel fitted to the angled plate and projecting forwardly therefrom, the roof of the tunnel being horizontal and its floor diagonal, a vertical septum and a longitudinal horizontal septum in said tunnel, forming horizontal and diagonal passages extending forwardly from the angled plate, to an angled front end of said tunnel matching said angled plate; and an eye-piece mounted on a plate at front likewise angled, to command the two passages respectively, by the upper and lower portions of said plate and eye-piece, each of said portions having mounted therein separate upper and lower elements comprising upper semi-circular lenses and lower semi-circular prisms.

16. An eye-testing apparatus comprising targets bearing thereon target test-units mounted upon two rotatable ring-gears, the target test-units being arranged on the targets in circular order, for distance vision on one target and for near vision on the other, one of the ring gears being provided with a cam, adapted to operate on either clockwise or counter-clockwise revolution of the gear, a switch located near the same and actuated thereby, a centrally-angled plate on which the gears are mounted, the lower section projected forwardly provided with slots one above the other, one target being mounted over each slot to present its target test-units therethrough, distance target test-units through the upper and near through the lower; illumination means behind the targets, comprising upper and lower bulbs adapted to illuminate alternately one of the targets, and darken the other, the gears and targets being so mutually arranged that one of said targets completes its display of target test-units as the other commences to display, the cam on the ring gear being set to actuate the switch to change the lights, at the moment completion of display of each target, a tunnel fixed to the angled plate above and below the slots, with passages therein matching and covering the said slots, the upper passage being horizontal and the lower diagonal; and an eye-piece angled to divide it into upper and lower sections, the lower section being projected forwardly to match with the angled plate and the upper section being vertical, said lower section being equipped with prisms without refraction, for near target test-units, and the upper equipped with plus lenses to view distance target test-units without added prisms.

ELLIS FREEMAN.

REFERENCES CITED

The following references are of record in the file of this patent:

UNITED STATES PATENTS

| Number | Name | Date |
| --- | --- | --- |
| 1,003,094 | Eastman | Sept. 12, 1911 |
| 1,417,283 | Sloan | May 23, 1922 |
| 1,777,866 | Steiss | Oct. 7, 1930 |
| 2,189,285 | Gruber | Feb. 6, 1940 |
| 2,326,965 | Neumueller | Aug. 17, 1943 |
| 2,364,793 | Jobe et al. | Dec. 12, 1944 |
| 2,365,547 | Hausherr | Dec. 19, 1944 |

FOREIGN PATENTS

| Number | Country | Date |
| --- | --- | --- |
| 386,733 | France | Apr. 17, 1908 |

OTHER REFERENCES

Bausch and Lomb publication entitled "Standard Practice in the Administration of Bausch and Lomb Occupational Vision Tests with the Ortho-Rater"; publ. in Rochester, New York, 1944, pages 8, 9 and 10.

Brewster's text "Stereoscope," publ. John Murray, Albermarle Street, London, 1856, pages 118, 119.